(12) United States Patent
Yasuda et al.

(10) Patent No.: US 7,950,490 B2
(45) Date of Patent: May 31, 2011

(54) FOUR-WHEEL VEHICLE SUSPENSION ARRANGEMENT

(75) Inventors: Kazuhiro Yasuda, Saitama (JP); Hideaki Suzuki, Saitama (JP); Shinji Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1040 days.

(21) Appl. No.: 11/510,676

(22) Filed: Aug. 28, 2006

(65) Prior Publication Data

US 2007/0051553 A1 Mar. 8, 2007

(30) Foreign Application Priority Data

Aug. 31, 2005 (JP) ................................. 2005-251541

(51) Int. Cl.
*B60K 8/00* (2006.01)
*B60G 11/00* (2006.01)

(52) U.S. Cl. ........................................ 180/291; 180/312
(58) Field of Classification Search .................. 180/210, 180/215, 311, 312
See application file for complete search history.

(56) References Cited

U.S. PATENT DOCUMENTS

| | | | |
|---|---|---|---|
| 3,977,693 A | | 8/1976 | Gamaunt |
| 4,582,157 A * | | 4/1986 | Watanabe ..................... 180/215 |
| 4,600,074 A * | | 7/1986 | Watanabe et al. ............. 180/251 |
| 4,650,029 A * | | 3/1987 | Foote et al. ................... 180/248 |
| 4,666,015 A * | | 5/1987 | Matsuda et al. ............... 180/233 |
| 4,757,872 A * | | 7/1988 | Inomata ........................ 180/291 |
| 5,515,940 A * | | 5/1996 | Shichinohe et al. .......... 180/376 |
| 5,575,352 A * | | 11/1996 | Suzuki et al. ................. 180/311 |
| 5,992,355 A * | | 11/1999 | Shichinohe et al. ........ 123/41.56 |
| 6,412,856 B1 * | | 7/2002 | Kajikawa et al. ......... 296/203.01 |
| 6,510,916 B2 * | | 1/2003 | Hori et al. ..................... 180/374 |
| 6,712,172 B2 * | | 3/2004 | Inagaki et al. ................ 180/292 |
| 6,732,830 B2 * | | 5/2004 | Gagnon et al. ................ 180/291 |
| 7,021,664 B2 * | | 4/2006 | Mercier et al. ................ 280/834 |
| 7,198,301 B2 * | | 4/2007 | Wozniak et al. .............. 280/830 |
| 7,434,822 B2 * | | 10/2008 | Takahashi et al. ...... 280/124.109 |
| 2002/0038737 A1 * | | 4/2002 | Morishita et al. ............. 180/291 |
| 2002/0074178 A1 * | | 6/2002 | Izumi ............................ 180/233 |
| 2003/0098195 A1 * | | 5/2003 | Fu et al. ........................ 180/291 |
| 2004/0124028 A1 * | | 7/2004 | Lachapelle et al. ........... 180/291 |
| 2005/0103553 A1 * | | 5/2005 | Korenjak et al. ............. 180/292 |
| 2006/0066069 A1 * | | 3/2006 | Yanai et al. ............. 280/124.135 |
| 2006/0231308 A1 * | | 10/2006 | Takahashi et al. ............ 180/89.1 |

FOREIGN PATENT DOCUMENTS

| | | |
|---|---|---|
| JP | 58-141978 A | 8/1983 |
| JP | 8-11770 A | 1/1996 |
| JP | 2001-301477 A | 10/2001 |

* cited by examiner

*Primary Examiner* — Terrell McKinnon
*Assistant Examiner* — Chiedu A Chibogu
(74) *Attorney, Agent, or Firm* — Birch, Stewart, Kolasch & Birch, LLP

(57) ABSTRACT

To enhance the balance in weight of the right and the left of the body of a four-wheel vehicle. In a four-wheel vehicle, an engine is supported by a body frame. A swing arm is swingably attached to the body frame. Rear wheels are supported by the swing arm. A rear cushion unit is attached between the rear of the body frame and the side of the rear end of the swing arm. Power from the engine is transmitted to the rear wheels via a rear propeller shaft. The center of the engine (that is, an axis of a crankshaft) and the rear cushion unit are set on one side and the rear propeller shaft is set on the other side respectively with respect to a center line of the body extending in a longitudinal direction of the body.

15 Claims, 7 Drawing Sheets

[ARRANGEMENT OF BATTERY (IN SIDE VIEW)]

[ARRANGEMENT OF BATTERY (IN PLAN)]

[ARRANGEMENT OF HOUSING BOX (IN SIDE VIEW)]

[ARRANGEMENT OF HOUSING BOX (IN PLAN)]

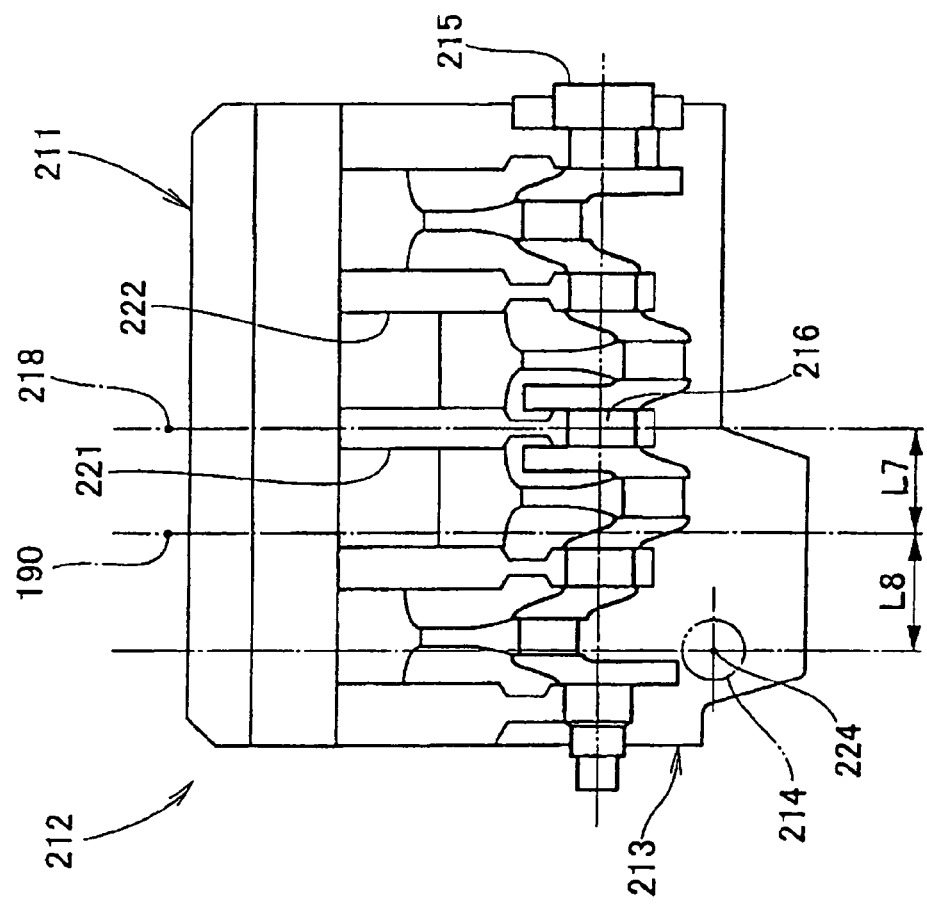
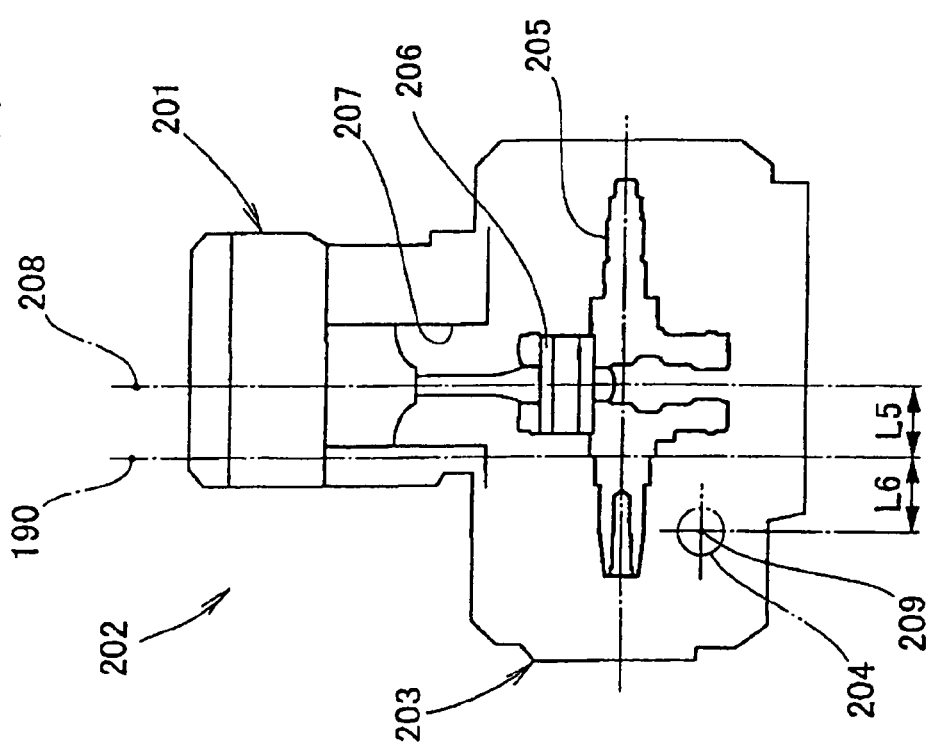

FOUR-WHEEL VEHICLE SUSPENSION ARRANGEMENT

CROSS-REFERENCE TO RELATED APPLICATIONS

This nonprovisional application claims priority under 35 U.S.C. §119(a) on Patent Application No. 2005-251541, filed in Japan on Aug. 31, 2005, the entirety of which is incorporated herein by reference.

BACKGROUND OF THE INVENTION

1. Field of the Invention

The present invention relates to the improvement of a four-wheel vehicle.

2. Description of Background Art

A four-wheel vehicle according to the background art is known from, for example, Japanese Patent Laid-Open No. Hei 08-11770 (hereinafter "the JP '770 document). In the JP '770 document, an engine is set on one side with respect to a center line of the body extending in a longitudinal direction of the body. In addition, a rear cushion for suspending right and left rear wheels is set on the other side with respect to the center line of the body.

Referring to FIG. 1 of the JP '770, a four-wheel vehicle according to the background art will be described. The center of the engine 12 (the center of an engine cylinder 12a) is set off a center line L of the body by "a" on the left side and the rear cushion 24 is set off the center line L of the body by "b" on the right side. In addition, a gear box 25, a pipe 21a and a drive shaft (not shown) housed in the pipe 21a are arranged on the same side as the engine 12. The outside diameter of the pipe 21a is the largest portion of a rear arm 21.

The engine 12, the gear box 25, the pipe 21a and the drive shaft are arranged on the same side with respect to the center line L of the body. Since all of these elements are heavy, it is difficult to balance the side of the engine 12 and the side of the rear cushion 24 in weight based upon the center line L of the body.

SUMMARY OF THE INVENTION

An object of the present invention is to enhance the balance in weight of the right and the left of the body of a four-wheel vehicle.

According to a first aspect of the present invention, a four-wheel vehicle includes an engine supported by a body frame, a swing arm swingably attached to the body frame, rear wheels supported by the swing arm, a rear cushion unit attached between the rear of the body frame and the side of the rear end of the swing arm and power from the engine is transmitted to the rear wheels via a drive shaft, and wherein the center of the engine and the rear cushion unit are arranged on one side with respect to a center line of the body extending in a longitudinal direction of the body and the drive shaft is arranged on the other side.

With the above construction according to the present invention, the balance between the weight of the engine and the rear cushion respectively arranged on one side with respect to the center line of the body and the weight of the drive shaft arranged on the other side based upon the center line of the body is made satisfactory.

According to a second aspect of the present invention, a rear differential case for distributing power from a drive shaft to right and left rear wheels is provided on the same side as the drive shaft with respect to a center line of the body.

With the above construction of the present invention, the drive shaft and the rear differential case are provided on the same side with respect to the center line of the body and a distance between the drive shaft and the rear differential case is shortened. In addition, the drive shaft and the rear differential case, and the center of the engine and the rear cushion unit are arranged on both sides of the center line of the body. Therefore, a balance in weight between the right and the left of the vehicle is enhanced.

According to a third aspect of the present invention, a distance between a center line of the body and a rear cushion unit is made substantially equal to a distance between the center line of the body and a drive shaft. With this construction according to the present invention, when the drive shaft is revolved and torsional moment that tries to twist a body frame is caused, the torsional moment is absorbed by a damping force of the rear cushion unit located at a substantially equal distance from the center line of the body to a distance between the drive shaft and the center line of the body.

According to a fourth aspect of the present invention, left and right arm members of a swing arm are arranged outside a drive shaft and outside a rear cushion unit in the body. With this construction according to the present invention, if the drive shaft is extended backward on the side of an axle for rear wheels and one end of a rear cushion unit is coupled to an axle pipe for passing the axle for rear wheels, the swing arm, the drive shaft and the rear cushion unit can satisfactorily support the axle for rear wheels without interference by arranging the left and right arm members of the swing arm outside the drive shaft and outside the rear cushion unit in the body.

According to a fifth aspect of the present invention, an electrical unit such as a battery or a housing box is arranged on the upside of a drive shaft. According to this construction according to the present invention, the electrical unit such as a battery or the housing box is arranged utilizing a space on the upside of the drive shaft. Therefore, a space of the four-wheel vehicle is effectively utilized. In addition, since the electrical unit such as a battery or the housing box is not protruded at the back of the body, the longitudinal length of the body is shortened.

According to first aspect of the present invention, the center of the engine and the rear cushion unit are arranged on one side and the drive shaft is arranged on the other side, respectively, with respect to the center line of the body extending in the longitudinal direction of the body. Therefore, the weight of the engine and the rear cushion unit and the weight of the drive shaft can be more satisfactorily balanced and the balance in weight of the right and the left of the vehicle can be enhanced.

According to the second aspect of the present invention, the rear differential case for distributing power from the drive shaft to the right and left rear wheels is provided on the same side as the drive shaft with respect to the center line of the body. Therefore, a distance between the drive shaft and the rear differential case can be shortened, the drive shaft can be shortened, and the drive shaft can be lightened. In addition, the weight of the drive shaft and the rear differential case and the weight of the engine and the rear cushion unit can be further balanced and the balance in weight of the right and the left of the vehicle can be further enhanced.

According to the third aspect of the present invention, a distance between the center line of the body and the rear cushion unit is made substantially equal to a distance between the center line of the body and the drive shaft. Therefore, torsional moment caused in the body frame by the revolution of the drive shaft can be absorbed by the damping force of the rear cushion unit and the torsional vibration of the body frame can be reduced.

According to the fourth aspect of the present invention, the left and right arm members of the swing arm are arranged outside the drive shaft and outside the rear cushion unit in the body. Therefore, interference between the swing arm and the drive shaft and interference between the swing arm and the rear cushion unit can be prevented and the axle for rear wheels can be satisfactorily supported by the swing arm.

According to the fifth aspect of the present invention, the electrical unit such as a battery or the housing box is arranged on the upside of the drive shaft. Therefore, the electrical unit such as a battery or the housing box can be arranged utilizing the space on the upside of the drive shaft, effectively utilizing the space of the four-wheel vehicle. In addition, the electrical unit such as a battery or the housing box does not protrude at the back of the body. Therefore, the longitudinal length of the body can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) and 7(b) are explanatory drawings showing the center of an engine in a power unit according to the present invention.

DETAILED DESCRIPTION OF THE PREFERRED EMBODIMENTS

Figure 1:
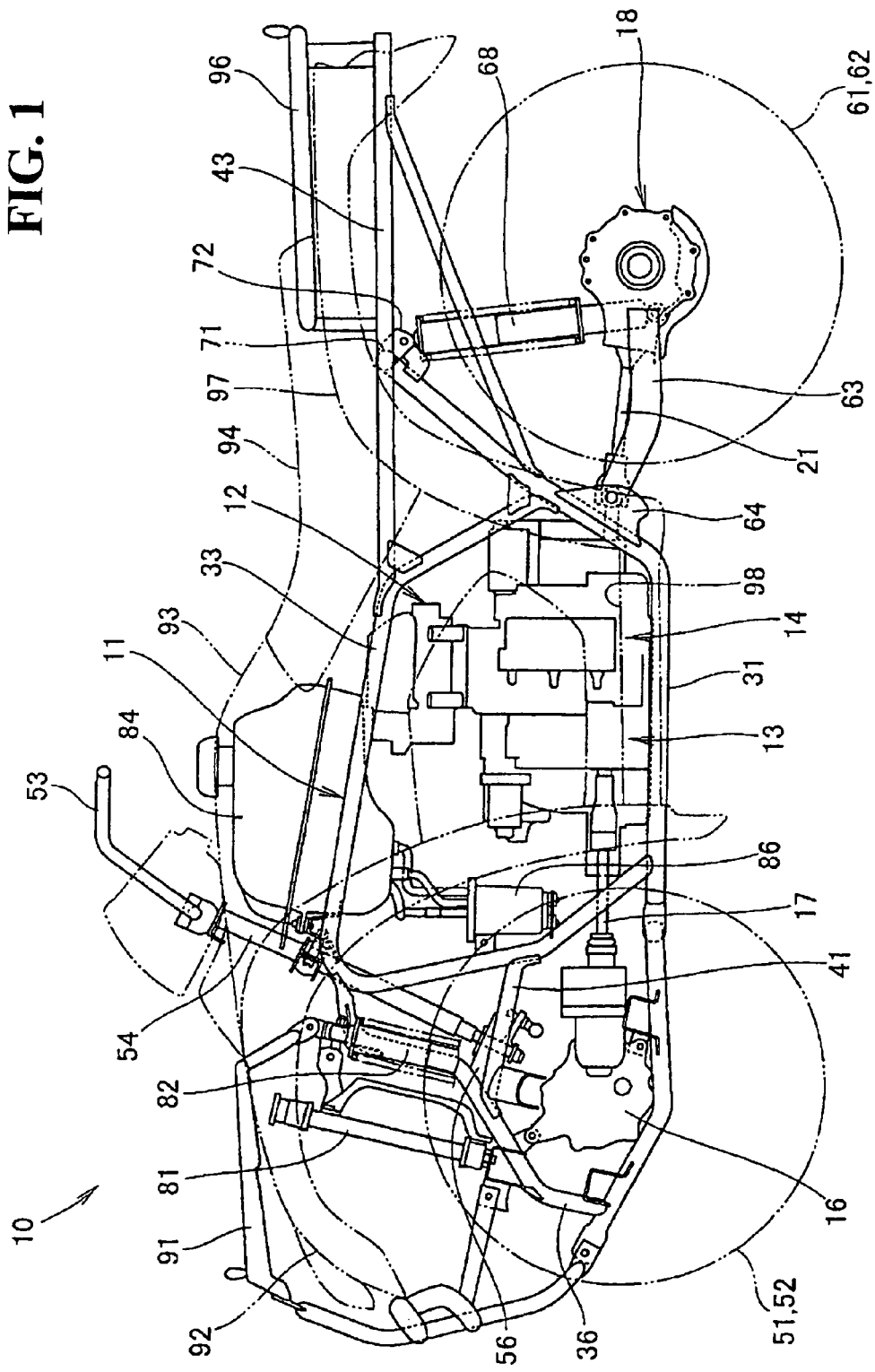
FIG. 1 is a side view showing a four-wheel vehicle according to the present invention.

Referring to the attached drawings, an embodiment of the present invention will be described below. The drawings should be viewed in the direction of orientation of the reference numerals.

FIG. 1 is a side view showing a four-wheel vehicle according to an embodiment of the present invention. In the four-wheel vehicle 10, a power unit 14 including a vertical engine 12 and a transmission 13 is arranged in the substantial center of a body frame 11. A front final assembly 16 arranged in front of the power unit 14 and the transmission 13 are coupled via a front propeller shaft 17. A rear final assembly 18 arranged at the back of the power unit 14 and the transmission 13 are coupled via a rear propeller shaft 21.

The body frame 11 is provided with a pair of left and right lower main frames 31, 32 (only the reference numeral 31 on this side is shown) for supporting a lower part of the power unit 14. A pair of left and right substantially U-shaped upper main frames 33, 34 (only the reference numeral 33 on this side is shown) are attached to each upper part of the lower main frames 31, 32 so that the upper main frames encircle the power unit 14 in a top view. A pair of left and right front frames 36, 37 (only the reference numeral 36 on this side is shown) couple each front upper part of the upper main frames 33, 34 and each front end of the lower main frames 31, 32. A pair of left and right front coupling frames 41, 42 (only the reference numeral 41 on this side is shown) couple each front frame 36, 37 and each upper main frame 33, 34. A pair of left and right rear upper frames 43, 44 (only the reference numeral 43 on this side is shown) extend backward from rear upper parts of the upper main frames 33, 34. Intermediate parts of the left and right rear upper frames 43, 44 are coupled to the rear ends of the lower main frames 31, 32.

Handlebars 53 for steering left and right front wheels 51, 52 are supported by a steering shaft 54. An upper part of the steering shaft 54 is rotatably attached to a cross member (not shown) located between the fronts of the left and right upper main frames 33, 34. A lower part of the steering shaft is rotatably attached to a cross plate 56 located between the left and right front coupling frames 41, 42.

A swing arm 63 for supporting left and right rear wheels 61, 62 and the rear final assembly 18 is attached to pivot brackets 64, 66 (only the reference numeral 64 on this side is shown) attached to the left and right lower main frames 31, 32 in a vertically swingable manner.

A rear cushion unit 68 for absorbing shock transmitted from the rear wheels 61, 62 to the body frame 11 is a shock absorber. An upper end of the shock absorber is attached to a rear cross pipe 71 located between the left and right rear upper frames 43, 44 via an upper bracket 72. A lower end of the shock absorber is attached to the side of the rear final assembly 18.

A reference numeral 81 in FIG. 1 identifies a radiator, reference numerals 82 and 83 (only the reference numeral 82 on this side is shown) identify a pair of left and right front cushion units, reference numeral 84 denotes a fuel tank, reference numeral 86 identifies a fuel pump, reference numeral 91 identifies a front carrier, reference numeral 92 identifies a front fender, reference numeral 93 identifies a body cover, reference numeral 94 identifies a seat, reference numeral 96 identifies a rear carrier, reference numeral 97 identifies a rear fender, and reference numeral 98 identifies a step floor.

Figure 2:
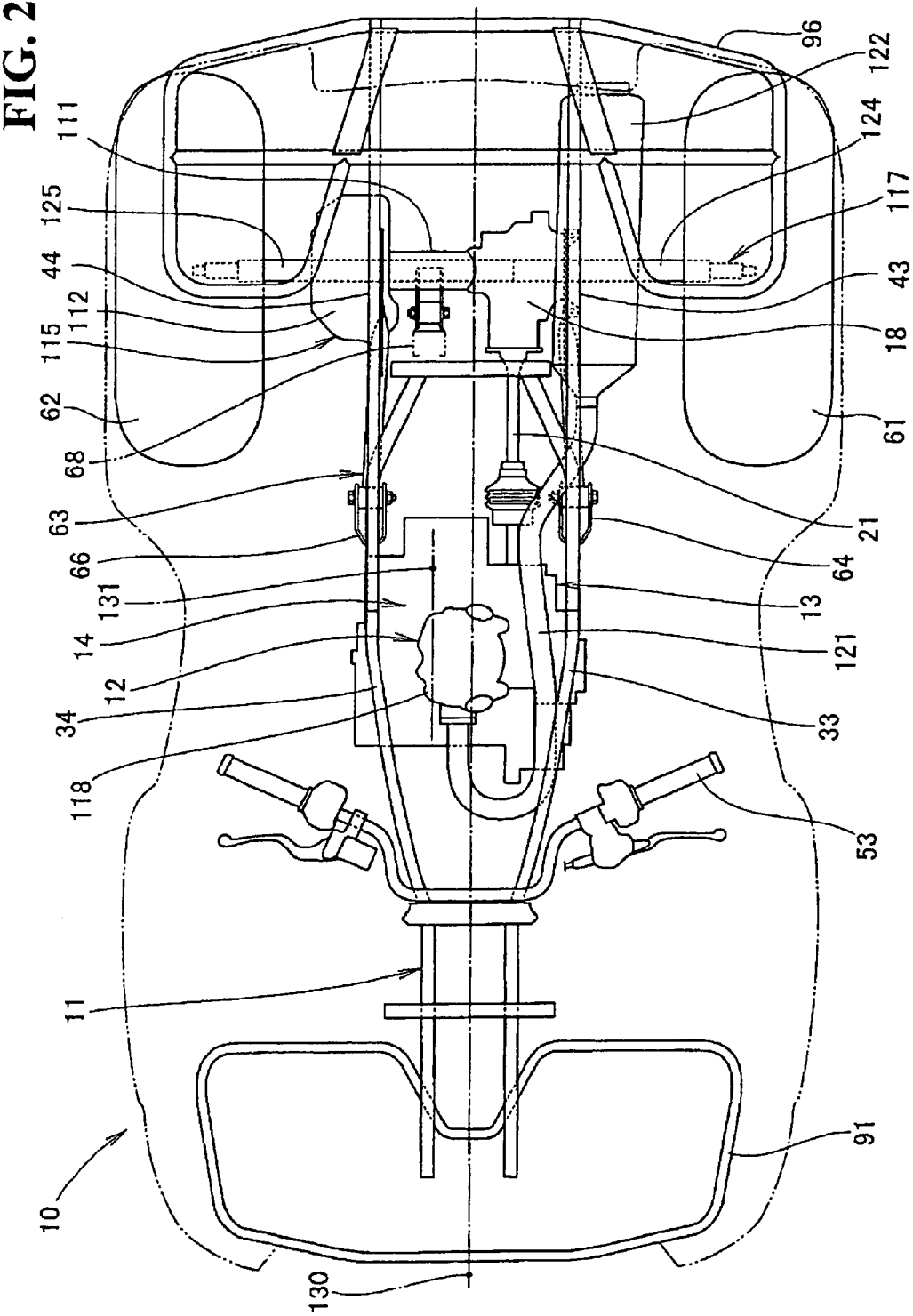
FIG. 2 is a plan view showing the four-wheel vehicle according to the present invention.

FIG. 2 is a plan showing the four-wheel vehicle according to an embodiment of the present invention. FIG. 2 shows that the power unit 14 is arranged below the left and right upper main frames 33, 34. The rear propeller shaft 21 extends backward from the transmission 13 provided on the left side of the power unit 14. The rear end of the rear propeller shaft 21 is coupled to the rear final assembly 18. An axle supporting part 115, in which the rear final assembly 18, an axle pipe 111 and a drum brake 112 are integrally attached, is attached to the rear end of the swing arm 63. An axle 117 for the left and right rear wheels 61, 62 is rotatably supported by the axle supporting part 115. An exhaust pipe 121 extends backward from the front of a cylinder head 118 provided to the engine 12. A muffler 122 is connected to a rear end of the exhaust pipe 121. Reference numerals 124, 125 identify a left axle and a right axle, respectively forming the axle 117.

A reference numeral 130 in FIG. 2 identifies a center line of the body extending in a longitudinal direction of the four-wheel vehicle 10. Reference numeral 131 identifies the axis (parallel to the center line 130 of the body) of a crankshaft (not shown) provided to the engine 12. The rear cushion unit 68, the drum brake 112 and the axis 131 of the crankshaft are set on the right side of the body with respect to the center line 130 of the body. The rear propeller shaft 21, the rear final assembly 18, most of the exhaust pipe 121 and the muffler 122 are set on the left side of the body.

Figure 3:
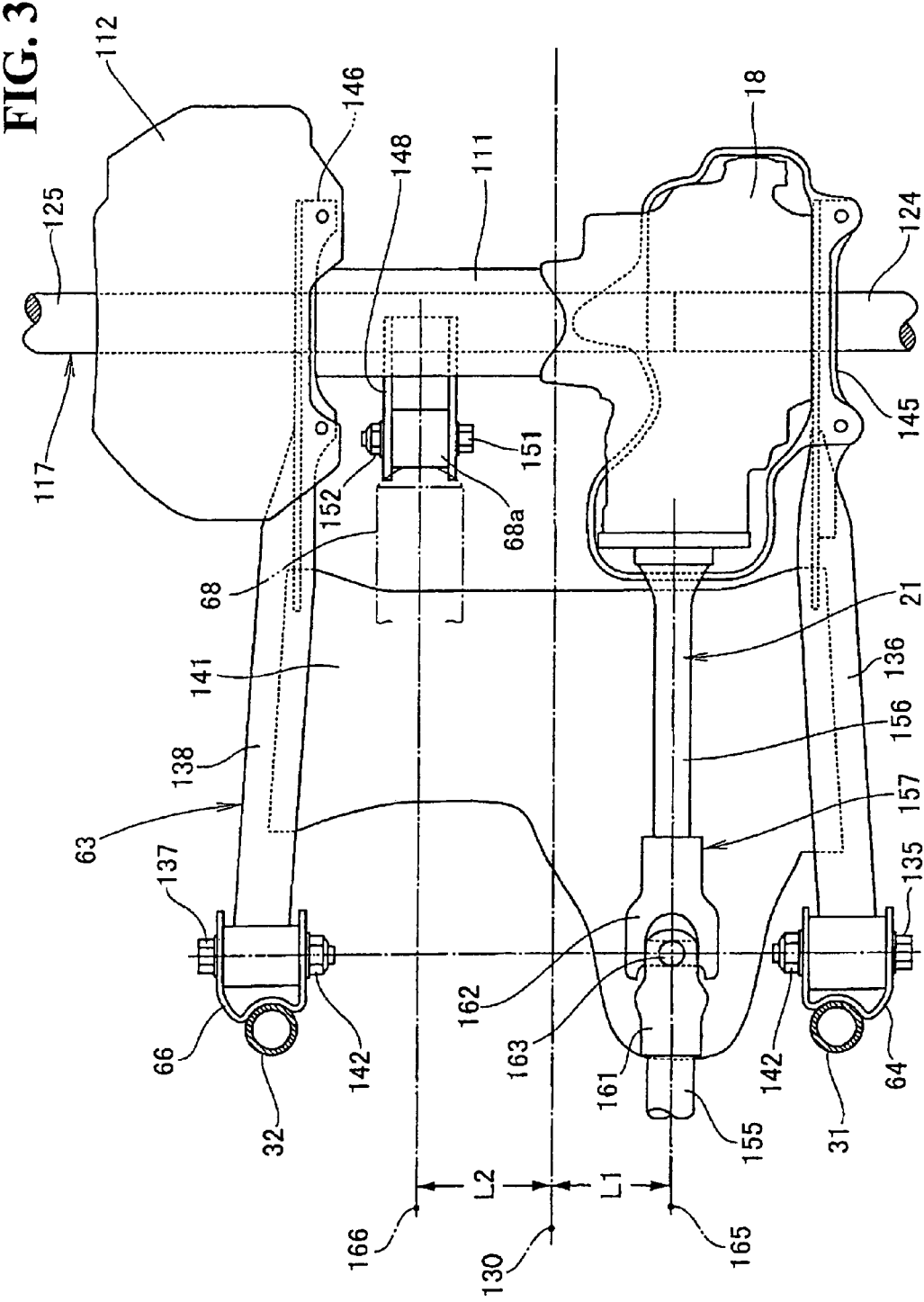
FIG. 3 is a plan view showing a main part around a swing arm according to the present invention.

FIG. 3 is a plan view showing a main part around the swing arm according to an embodiment of the present invention. FIG. 3 shows that the swing arm 63 includes a left arm 136 swingably attached to the pivot bracket 64 on the left side via a bolt 135 as an axle. A right arm 138 is swingably attached to the pivot bracket 66 on the right side via a bolt 137 as an axle. A coupling plate 141 is attached between the left arm 136 and the right arm 138.

The coupling plate 141 is a member that covers a lower side of the rear propeller shaft 21 to protect the rear propeller shaft from flying gravel. Reference numerals 142, 142 identify nuts screwed to the ends of the bolts 135, 137.

The left arm 136 is provided with a left mounting part 145 for attaching the rear final assembly 18 to a rear end of the left arm. The right arm 138 is provided with a right mounting part 146 for attaching the drum brake 112 to a right end of the right arm.

The axle pipe 111 for coupling the rear final assembly 18 and the drum brake 112 has a cushion supporting bracket 148 attached to a periphery thereof A lower end 68a of the rear cushion unit 68 is swingably attached to the cushion supporting bracket 148 with a bolt 151 and a nut 152.

The rear propeller shaft 21 includes a first shaft 155 coupled to the side of the transmission 13 (see FIG. 2). A second shaft 156 is coupled to the side of the rear final assembly 18. A hook type joint 157 couples the first shaft 155 and the second shaft 156.

A position in the longitudinal direction of the vehicle of a spider 163 for coupling an input side yoke 161 and an output side yoke 162 forming the hook type joint 157 is equivalent to positions in the longitudinal direction of the vehicle of the bolts 135, 137 which function as each swinging shaft of the swing arm 63. Therefore, the propeller shaft 21 is naturally curved when the swing arm 63 is swung and power is transmitted.

The rear propeller shaft 21 is located in the substantial center of the center line 130 of the body and the left arm 136 of the swing arm 63, and the rear cushion unit 68 is located in the substantial center of the center line 130 of the body and the right arm 138 of the swing arm 63.

When the axis of the rear propeller shaft 21 is 165 and the axis of the rear cushion unit 68 is 166, a distance L1 from the center line 130 of the body to the axis 165 and a distance L2 from the center line 130 of the body to the axis 166 are substantially equal.

Figure 4:
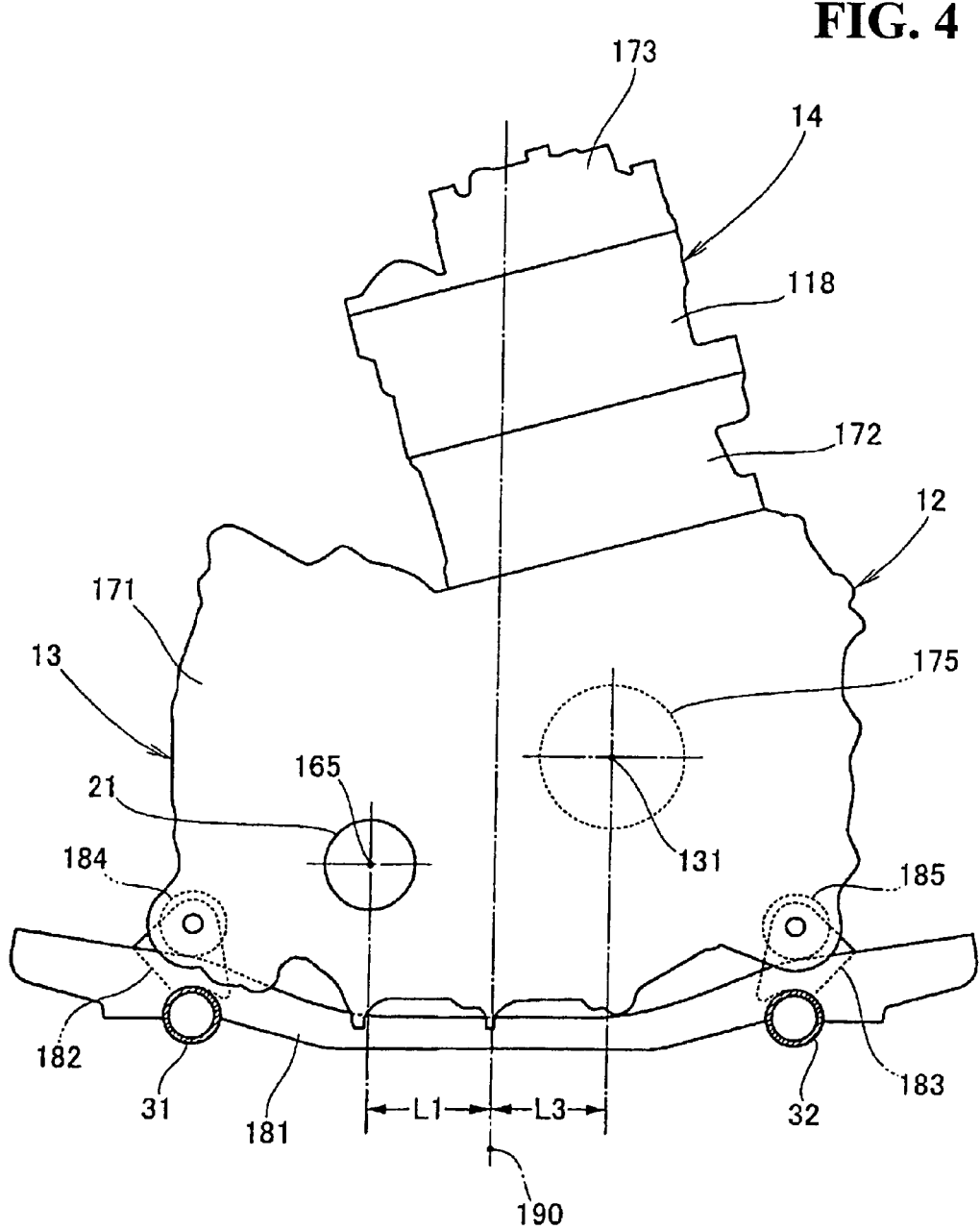
FIG. 4 is a back view showing a power unit according to the present invention.

FIG. 4 is a back view showing the power unit according to and embodiment of the present invention. FIG. 4 shows that the power unit 14 is provided with a crankcase 171. A cylinder block 172 is attached to the top side of the crankcase 171. The cylinder head 118 is attached to the top side of the cylinder block 172. A head cover 173 covers the top side of the cylinder head 118, and shows that a crankshaft 175 is pivotably arranged in the crankcase 171.

A right part of the power unit 14 including the cylinder block 172, the cylinder head 118, the head cover 173, the right side of the crankcase 171 and the crankshaft 175 forms the engine 12. A left part of the power unit 14 including a plurality of gears, containing gears engaged with gears provided to the crankshaft 175 and the left side of the crankcase, 171 forms the transmission 13. The rear propeller shaft 21 is coupled to an output shaft of the transmission 13.

A reference numeral 181 in FIG. 4 identifies a cross member located between the left and right lower main frames 31, 32. Reference numerals 182 and 183 identify engine supporting brackets attached to the lower main frames 31, 32 and the cross member 181. Reference numerals 184 and 185 identify supported parts provided to the crankcase 171 for being supported by the engine supporting brackets 182, 183.

The crankshaft 175 and the rear propeller shaft 21 are located on opposite sides in the width direction of the body with respect to a center line 190 that vertically extends perpendicular to the center line 130 (see FIG. 2) of the body. A distance L3 between the center line 190 and the axis 131 of the crankshaft 175 is substantially equal to a distance L1 between the center line 190 and the axis 165 of the rear propeller shaft 21. The axis 131 of the crankshaft 175 is the center of the engine 12 in this case.

Figure 5A:
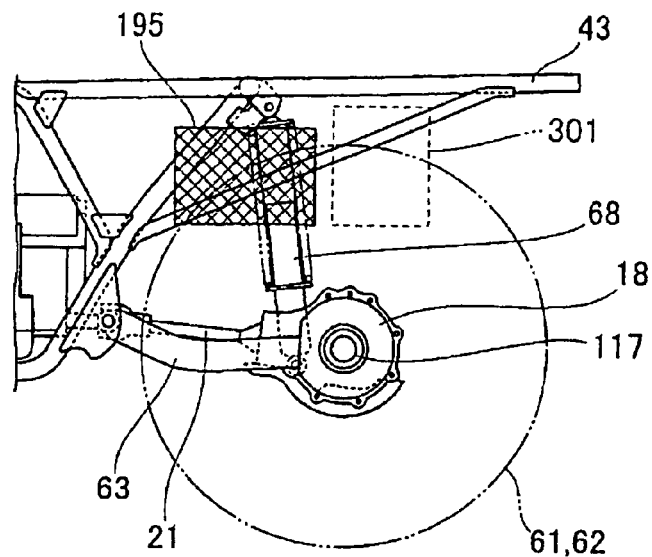
FIGS. 5(a) and 5(b) are explanatory drawings showing the arrangement of a battery in the rear of the body according to the present invention.
Figure 5B:
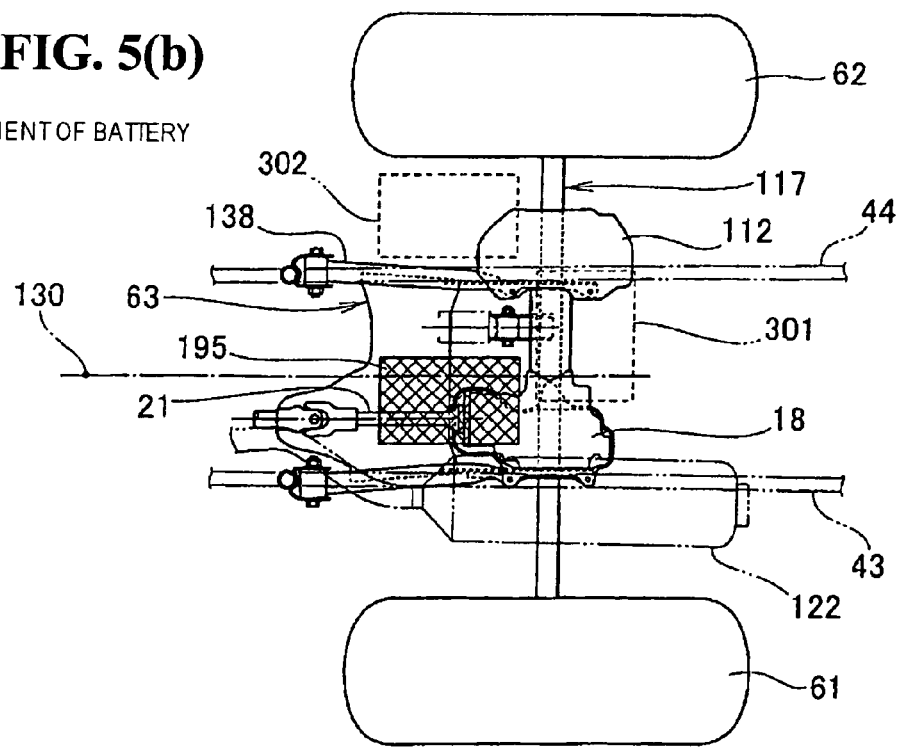

FIGS. 5A and 5B are explanatory drawings for explaining the arrangement of a battery in the rear of the body according to an embodiment of the present invention.

FIG. 5A is a side view showing the rear of the body. The battery 195 (a part shown by cross-hatching) is arranged on this side of the rear cushion unit 68 so that the battery overlaps with the rear cushion unit 68 when they are viewed from the side. A reference numeral 301 in FIG. 5A denotes a battery (a part shown by a broken line) shown as a comparative example. The battery 301 in the comparative example is located at the back of the axle for the rear wheels 117 in the vehicle, however, the battery 195 in the present invention is located in front of the battery 301 and is arranged nearer to the center in the longitudinal direction of the body. It is advantageous to driving performance such as turning performance of the four-wheel vehicle to locate the battery 195 in the above manner.

FIG. 5B is a plan showing the rear of the body. The battery 195 is arranged above the fronts of the rear propeller shaft 21 and the rear final assembly 18. The battery 301 as the comparative example is located at the back of the axle 117 and between the rear final assembly 18 and the drum brake 112. In addition, a battery 302 as a comparative example is located between the right arm 138 of the swing arm 63 and one rear wheel 62, i.e. outside the right rear upper frame 44 in the body.

The battery 302 is close to the rear wheel 62. Therefore, a guard member for protecting the battery 302 from flying gravel from the side of the rear wheel 62 when the vehicle runs is required. However, the battery 195 of the present invention is located inside the body. Therefore, no guard member is required.

Figure 6A:
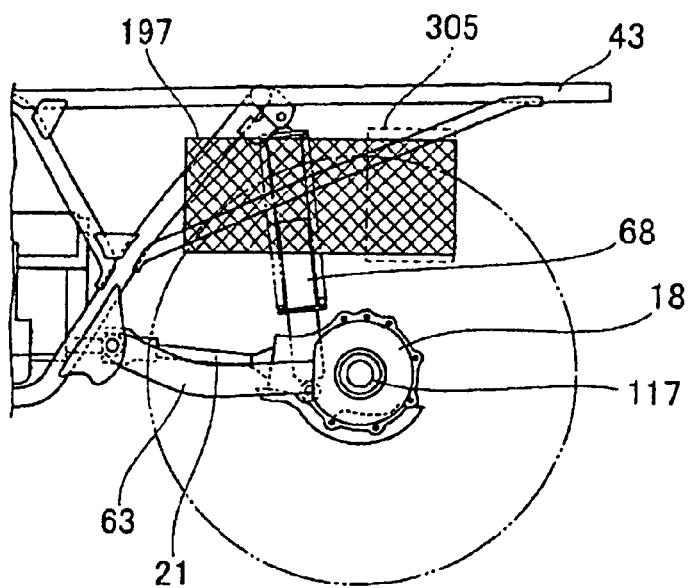
FIGS. 6(a) and 6(b) are explanatory drawings showing the arrangement of a housing box in the rear of the body according to the present invention.
Figure 6B:
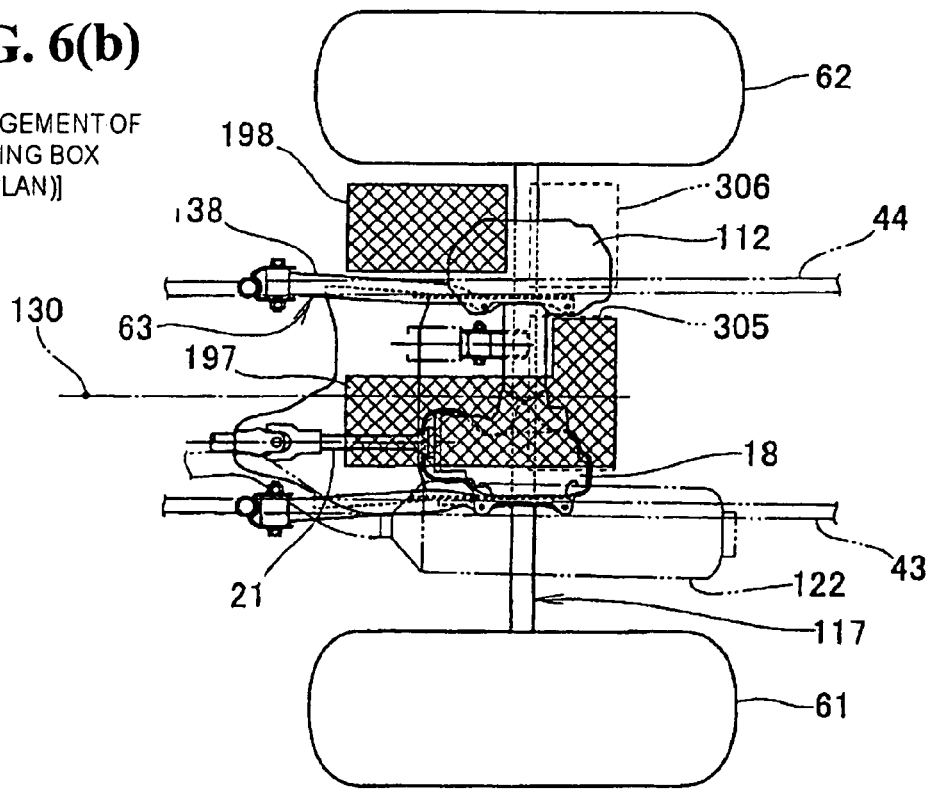

FIGS. 6A and 6B are explanatory drawings for explaining the arrangement of a housing box in the rear of the body according to an embodiment of the present invention.

FIG. 6A is a side view showing the rear of the body. The housing box 197 (a part shown by cross-hatching) is arranged so that the housing box overlaps with the rear cushion unit 68 when they are viewed from the side. The housing box extends to the back of the axle 117 in the body. A reference numeral 305 (a part shown by a broken line) in FIG. 6A identifies a housing box shown as a comparative example. The housing box 305 as the comparative example is located at the back of the axle 117. Therefore, a center of gravity of the body is moved backward if something heavy thing is housed, in the housing box 305. It is not desirable for the driving performance to have the center of gravity located in such a manner.

The housing box 197 is arranged so that it extends a long distance before and after the axle 117. However, the capacity on the front side of the axle 117 is more. Therefore, the center of gravity of the body is hardly moved backward.

FIG. 6B is a plan showing the rear of the body. The housing box 197 is arranged above the back of the axle 117 and above and between the rear final assembly 18 and the drum brake 112 in addition to being arranged above the rear propeller shaft 21, the rear final assembly 18 and the center line 130 of the body. The housing box 305 as the comparative example is located only above the back of the axle 117 and between the rear final assembly 18 and the drum brake 112.

The housing capacity of the housing box 197 can be enlarged by shaping the housing box 197 in the shape of an "L" when it is viewed from the top.

A housing box 198 (another part shown by cross-hatching) may also be arranged between the right arm 138 of the swing arm 63 and the rear wheel 62, i.e. outside of the rear upper frame 44. The housing box 198 is close to the rear wheel 62. However, even if flying gravel from the side of the rear wheel 62 hits the bottom of the housing box 198, no problem occurs.

A housing box 306 as a comparative example is arranged at the back of the axle 117 and outside the rear upper frame 44. As in the case of the housing box 305, when something heavy thing is housed in the housing box 306, the driving performance is not satisfactory.

FIGS. 7A and 7B are explanatory drawings showing the center of an engine in the power unit according to an embodiment of the present invention.

As shown in FIG. 7A, a power unit 202 in which an engine 201 has a single cylinder, or the number of cylinders is an odd number, is mounted on the body frame 11 (see FIG. 1) transversely. If a rear propeller shaft 204 extends backward from a transmission 203 provided to the power unit 202, a center line 208 (that is, an axis passing the center of a cylinder bore 207) passing the center of a crankpin 206 provided to a crankshaft 205 (a part shown by a thick line) of the engine 201 is the center of the engine 201. At this time, a distance L5 from the center line 190 in the width direction of the body to the center line 208 and a distance L6 from the center line 190 in the width direction of the body to an axis 209 of the propeller shaft 204 are substantially equal.

If a plurality of cylinders are provided, a center line (that is, the axis passing the center of the cylinder bore in the center) passing the center of the crankpin corresponding to the central cylinder bore shall be the center of the engine.

As shown in FIG. 7B, if a power unit 212 in which an engine 211 has four cylinders, i.e. the number of cylinders is an even number, is mounted on the body frame 11 (see FIG. 1) transversely and a rear propeller shaft 214 extends backward from a transmission 213 provided to the power unit 212, a center line 218 (that is, a center line between two cylinder bores 221, 222 in the center) passing the center in the width of a journal 216 provided to the center of a crankshaft 215 (a part shown by a thick line) of the engine 211 shall be the center of the engine 211. At this time, a distance L7 from the center line 190 in the width direction of the body to the center line 218 and a distance L8 from the center line 190 in the width direction of the body to an axis 224 of the rear propeller shaft 214 are substantially equal.

As shown in FIGS. 2 and 4, a first aspect of the present invention is directed to a four-wheel vehicle 10 where the engine 12 is supported by the body frame 11, the swing arm 63 is swingably attached to the body frame 11, the rear wheels 61, 62 are supported by the swing arm 63, the rear cushion unit 68 is attached between the rear of the body frame 11 and the rear end side of the swing arm 63 and power from the engine 12 is transmitted to the rear wheels 61, 62 via the rear propeller shaft 21 as a drive shaft. The center of the engine 12 (that is, the axis 131 of the crankshaft 175) and the rear cushion unit 68 are set on one side and the rear propeller shaft 21 is set on the other side, respectively, with respect to the center line 130 that extends in the longitudinal direction of the body.

With the above construction according to the present invention, the weight of the engine 12 and the rear cushion unit 68 and the weight of the rear propeller shaft 21 are more satisfactorily balanced and the balance in weight of the right and the left of the four-wheel vehicle 10 can be enhanced.

According to a second aspect of the present invention, the rear final assembly 18 as a rear differential case for distributing power from the rear propeller shaft 21 to the left and right rear wheels 61, 62 is provided on the same side as the rear propeller shaft 21 with respect to the center line 130 of the body.

With the above construction according to the present invention, a distance between the rear propeller shaft 21 and the rear final assembly 18 can be shortened, the rear propeller shaft 21 can be shortened, and the rear propeller shaft can be lightened. In addition, the weight of the rear propeller shaft 21 and the rear final assembly 18 and the weight of the engine 12 and the rear cushion unit 68 are balanced more and the balance in weight of the right and the left of the four-wheel vehicle 10 can be further enhanced.

According to the third aspect of the present invention, as shown in FIGS. 2 and 3, the distance L2 between the center line 130 of the body and the rear cushion unit 68 is substantially equal to the distance L1 between the center line 130 of the body and the rear propeller shaft 21.

With the above construction according to the present invention, the torsional moment caused in the body frame 11 by the revolution of the rear propeller shaft 21 can be absorbed by the damping force of the rear cushion unit 68 and torsional vibration of the body frame 11 can be reduced.

According to the fourth aspect of the present invention, the left arm 136 and the right arm 138 as left and right arm members of the swing arm 63 are arranged outside the rear propeller shaft 21 and outside the rear cushion unit 68 in the body.

With the above construction according to the present invention, interference between the swing arm 63 and the rear propeller shaft 21 or the rear cushion unit 68 can be prevented and the axle for the rear wheels 117 can be satisfactorily supported by the swing arm 63.

According to the fifth aspect of the present invention as shown in FIGS. 1, 5 and 6, an electrical unit such as the battery 195 or the housing box 197 is arranged above the rear propeller shaft 21.

With the above construction according to the present invention, the electrical unit such as the battery 195 or the housing box 197 can be arranged utilizing a space above the rear propeller shaft 21. Therefore, a space of the four-wheel vehicle 10 can be effectively utilized. In addition, the electrical unit such as the battery 195 or the housing box 197 does not protrude backward from the body. Therefore, the longitudinal length of the body can be shortened.

It should be noted that the present invention is suitable for a four-wheel vehicle; however, the present invention can also be applied to other vehicles as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A four-wheel vehicle, comprising:
a body frame;
an engine supported by the body frame;
a left and right swing arm swingably attached to the body frame;
rear wheels supported by the swing arm;
a rear cushion unit attached between a rear of the body frame and a rear end side of the swing arm; and
a drive shaft connected between the engine and the rear wheels, power from the engine being transmitted to the rear wheels via the drive shaft,
wherein a center of the engine and a center of the rear cushion unit are arranged on one side with respect to a center line of the body frame extending in a longitudinal direction of the body frame, and the drive shaft is arranged on the other side with respect to the center line, and
wherein a distance between the center line of the body frame and the rear cushion unit is substantially equal to a distance between the center line of the body frame and the drive shaft.

2. The four-wheel vehicle according to claim 1, wherein a rear differential case for distributing power from the drive shaft to the right and left rear wheels is provided on the same side as the drive shaft with respect to the center line of the body frame.

3. The four-wheel vehicle according to claim 1, wherein the left and right arm members of the swing arm are arranged outside the drive shaft and outside the rear cushion unit in the body frame.

4. The four-wheel vehicle according to claim 2, wherein the left and right arm members of the swing arm are arranged outside the drive shaft and outside the rear cushion unit in the body frame.

5. The four-wheel vehicle according to claim 1, wherein an electrical unit or housing box is arranged above the drive shaft.

6. The four-wheel vehicle according to claim 1, wherein a battery is arranged above the drive shaft.

7. A vehicle, comprising:
a body frame;
an engine supported by the body frame;
a left and right swing arm swingably attached to the body frame;
a least one rear wheel supported by the swing arm;
a rear cushion unit attached between a rear of the body frame and a rear end side of the swing arm; and
a drive shaft connected between the engine and the rear wheels,
wherein a center of the engine and a center of the rear cushion unit are arranged on one side of a longitudinal center line of the body frame, and the drive shaft is arranged on an opposite side of the longitudinal center line from the center of the engine and the center of the rear cushion unit, and
wherein a distance between the center line of the body frame and the rear cushion unit is substantially equal to a distance between the center line of the body frame and the drive shaft.

8. The vehicle according to claim 7, wherein a rear differential case for distributing power from the drive shaft to the right and left rear wheels is provided on the same side as the drive shaft with respect to the center line of the body frame.

9. The vehicle according to claim 7, wherein the left and right arm members of the swing arm are arranged outside the drive shaft and outside the rear cushion unit in the body frame.

10. The vehicle according to claim 8, wherein the left and right arm members of the swing arm are arranged outside the drive shaft and outside the rear cushion unit in the body frame.

11. The vehicle according to claim 7, wherein an electrical unit or housing box is arranged above the drive shaft.

12. The vehicle according to claim 11, wherein is a battery is arranged above the drive shaft.

13. A vehicle, comprising:
a body frame;
an engine supported by the body frame;
a left and right swing arm swingably attached to the body frame;
rear wheels supported by the swing arm;
a rear cushion unit attached between a rear of the body frame and a rear end side of the swing arm;
a drive shaft connected between the engine and the rear wheels, power from the engine being transmitted to the rear wheels via the drive shaft; and
an accessory;
wherein a center of the engine and a center of the rear cushion unit are arranged on one side with respect to a center line of the body frame extending in a longitudinal direction of the body frame, and the drive shaft and the center of the accessory are arranged on the other side with respect to the center line, or a housing box to —wherein the accessory is an electrical unit or a housing box; and wherein a distance between the center line of the body frame and the rear cushion unit is substantially equal to a distance between the center line of the body frame and the drive shaft.

14. The vehicle according to claim 13, wherein the accessory is the electrical unit.

15. The vehicle according to claim 14, wherein the electrical unit is a battery.

* * * * *